US007092369B2

(12) United States Patent
Fuccello et al.

(10) Patent No.: US 7,092,369 B2
(45) Date of Patent: Aug. 15, 2006

(54) COMMUNICATIONS NETWORK WITH WIRELESS GATEWAYS FOR MOBILE TERMINAL ACCESS

(75) Inventors: James R. Fuccello, Patchogue, NY (US); Allan Herrod, Mission Viejo, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 1062 days.

(21) Appl. No.: 09/909,176

(22) Filed: Jul. 19, 2001

(65) Prior Publication Data

US 2002/0019985 A1    Feb. 14, 2002

Related U.S. Application Data

(63) Continuation-in-part of application No. 08/827,263, filed on Mar. 28, 1997, now Pat. No. 6,747,692.

(60) Provisional application No. 60/006,872, filed on Nov. 17, 1995.

(51) Int. Cl.
*H04Q 7/00* (2006.01)
*H04L 12/56* (2006.01)

(52) U.S. Cl. ............... 370/328; 370/338; 370/400; 455/422.1

(58) Field of Classification Search ........... 370/310, 370/315, 328, 338, 400–401, 395.2, 395.52; 709/217–219, 223–229, 249; 455/414.1–3
See application file for complete search history.

(56) References Cited

U.S. PATENT DOCUMENTS

| 5,202,829 A | 4/1993 | Geier |
| 5,225,842 A | 7/1993 | Brown et al. |
| 5,257,195 A | 10/1993 | Hirata |
| 5,293,170 A | 3/1994 | Lorenz et al. |
| 5,311,195 A | 5/1994 | Mathis et al. |
| 5,323,164 A | 6/1994 | Endo |
| 5,343,209 A | 8/1994 | Sennott et al. |
| 5,345,244 A | 9/1994 | Gildea et al. |
| 5,347,284 A | 9/1994 | Volpi et al. |
| 5,347,536 A | 9/1994 | Meehan |
| 5,379,224 A | 1/1995 | Brown et al. |
| 5,402,347 A | 3/1995 | McBurney et al. |
| 5,416,712 A | 5/1995 | Geier et al. |
| 5,420,593 A | 5/1995 | Niles |

(Continued)

FOREIGN PATENT DOCUMENTS

EP          0511741          11/1992

(Continued)

OTHER PUBLICATIONS

Internet-Draft, *DHCP Authentication Via Kerberos V,* Hornstein et al., Standards Track, Oct. 4, 2000, pp. 1-26.

*Primary Examiner*—Chi Pham
*Assistant Examiner*—Tri H. Phan
(74) *Attorney, Agent, or Firm*—Kirschstein, et al

(57) ABSTRACT

Access to a communications network is provided to a user supporting a mobile unit capable of wireless communication with at least one access node of a local area network that is capable of connecting to the communications network. Initially, wireless communication is established between the mobile unit and the access node by associating the mobile unit with the access node. The user of the mobile unit is authenticated to enable access to the communications network. Communication with a destination on the communications network is then established, and at least some session particulars are recorded of a communications session during which the mobile unit communicates with the destination on a server on the network.

19 Claims, 9 Drawing Sheets

U.S. PATENT DOCUMENTS

| | | |
|---|---|---|
| 5,440,313 A | 8/1995 | Osterdock et al. |
| 5,450,344 A | 9/1995 | Woo et al. |
| 5,504,684 A | 4/1996 | Lau et al. |
| 5,535,278 A | 7/1996 | Cahn et al. |
| 5,592,173 A | 1/1997 | Lau et al. |
| 5,625,668 A | 4/1997 | Loomis et al. |
| 5,663,734 A | 9/1997 | Krasner |
| 5,663,735 A | 9/1997 | Eshenbach |
| 5,699,526 A | 12/1997 | Siefert |
| 5,699,528 A | 12/1997 | Hogan |
| 5,781,156 A | 7/1998 | Krasner |
| 5,786,789 A | 7/1998 | Janky |
| 5,812,087 A | 9/1998 | Krasner |
| 5,825,327 A | 10/1998 | Krasner |
| 5,828,694 A | 10/1998 | Schipper |
| 5,831,574 A | 11/1998 | Krasner |
| 5,841,396 A | 11/1998 | Krasner |
| 5,845,203 A | 12/1998 | LaDue |
| 5,845,287 A | 12/1998 | Ronen |
| 5,854,605 A | 12/1998 | Gildea |
| 5,874,914 A | 2/1999 | Krasner |
| 5,877,724 A | 3/1999 | Davis |
| 5,877,725 A | 3/1999 | Kalafus |
| 5,883,594 A | 3/1999 | Lau |
| 5,884,214 A | 3/1999 | Krasner |
| 5,889,474 A | 3/1999 | LaDue |
| 5,903,654 A | 5/1999 | Milton et al. |
| 5,905,719 A * | 5/1999 | Arnold et al. ............... 370/330 |
| 5,907,809 A | 5/1999 | Molnar et al. |
| 5,917,444 A | 6/1999 | Loomis et al. |
| 5,920,283 A | 7/1999 | Shaheen et al. |
| 5,923,703 A | 7/1999 | Pon et al. |
| 5,926,131 A | 7/1999 | Sakumoto et al. |
| 5,936,572 A | 8/1999 | Loomis et al. |
| 5,943,363 A | 8/1999 | Hanson et al. |
| 5,945,944 A | 8/1999 | Krasner |
| 5,963,582 A | 10/1999 | Stansell, Jr. |
| 5,977,909 A | 11/1999 | Harrison et al. |
| 5,982,324 A | 11/1999 | Watters et al. |
| 5,987,016 A | 11/1999 | He |
| 5,999,124 A | 12/1999 | Sheynblat |
| 6,002,362 A | 12/1999 | Gudat |
| 6,002,363 A | 12/1999 | Krasner |
| 6,009,551 A | 12/1999 | Sheynblat |
| 6,016,119 A | 1/2000 | Krasner |
| 6,040,798 A | 3/2000 | Kinal et al. |
| 6,041,222 A | 3/2000 | Horton et al. |
| 6,047,017 A | 4/2000 | Cahn et al. |
| 6,052,081 A | 4/2000 | Krasner |
| 6,061,018 A | 5/2000 | Sheynblat |
| 6,064,336 A | 5/2000 | Krasner |
| 6,104,338 A | 8/2000 | Krasner |
| 6,104,340 A | 8/2000 | Krasner |
| 6,107,960 A | 8/2000 | Krasner |
| 6,111,540 A | 8/2000 | Krasner |
| 6,131,067 A | 10/2000 | Girerd et al. |
| 6,133,871 A | 10/2000 | Krasner |
| 6,133,873 A | 10/2000 | Krasner |
| 6,133,874 A | 10/2000 | Krasner |
| 6,150,980 A | 11/2000 | Krasner |
| 6,236,354 B1 | 5/2001 | Krasner |
| 6,240,091 B1 * | 5/2001 | Ginzboorg et al. ......... 370/401 |
| 6,263,432 B1 | 7/2001 | Sasmazel et al. |
| 6,295,024 B1 | 9/2001 | King et al. |
| 6,313,786 B1 | 11/2001 | Sheynblat et al. |
| 6,327,473 B1 | 12/2001 | Soliman et al. |
| 6,466,161 B1 | 10/2002 | Turetzky et al. |
| 6,466,612 B1 | 10/2002 | Kohli et al. |
| 6,473,097 B1 * | 10/2002 | Elliott ....................... 715/733 |
| 6,529,829 B1 | 3/2003 | Turetzky et al. |
| 6,563,800 B1 * | 5/2003 | Salo et al. .................. 370/264 |
| 6,633,255 B1 | 10/2003 | Krasner |
| 6,680,695 B1 | 1/2004 | Turetzky et al. |
| 6,707,423 B1 | 3/2004 | Turetzky et al. |
| 6,873,288 B1 | 3/2005 | Heppe |
| 2002/0064209 A1 | 5/2002 | Turetzky et al. |

FOREIGN PATENT DOCUMENTS

| | | |
|---|---|---|
| EP | 000939571 A1 * | 9/1999 |
| EP | 1 081 895 A1 | 3/2001 |
| GB | 2115195 | 1/1983 |
| JP | 58-105632 | 6/1983 |
| JP | 7-36035 | 5/1986 |
| JP | 4-326079 | 11/1992 |
| WO | WO 90/11652 | 10/1990 |
| WO | WO 00/45191 | 8/2000 |
| WO | WO 00/72572 A2 | 11/2000 |
| WO | WO 01/41470 A2 | 6/2001 |

* cited by examiner

COMMUNICATIONS NETWORK WITH WIRELESS GATEWAYS FOR MOBILE TERMINAL ACCESS

CROSS REFERENCE TO RELATED CASES

This application is a continuation-in-part of U.S. patent application Ser. No. 08/827,263, filed Mar. 28, 1997 now U.S. Pat. No. 6,747,692.

This application is related to U.S. patent application Ser. No. 09/589,514, filed Jun. 8, 2000 and to U.S. patent application Ser. No. 09/520,929, filed Mar. 8, 2000, which is a divisional of U.S. patent application Ser. No. 08/916,605, filed Aug. 22, 1997, which in turn is a continuation of U.S. patent application Ser. No. 08/691,263, filed Aug. 2, 1996, now abandoned, which claims the benefit of U.S. Provisional Application Ser. No. 60/006,872, filed Nov. 17, 1995.

All of the above applications are commonly assigned with the assignee of the instant application.

BACKGROUND OF THE INVENTION

1. Field of the Invention

The invention relates to a portable computing device or terminal, and in particular a device arranged to link up to the Internet or a private computer network.

2. Description of the Related Art

The Internet computer network is gaining ever-increasing significance in the world of science, technology, information and commerce among many others. The Internet will be well known to the skilled reader but, in brief summary, comprises a network of computers practically worldwide and accessible from any access point suitably linked to retrieve information contained in the Internet. Various sub-networks exist within the Internet, one of the best known of which is the worldwide web.

Information is commonly stored on the Internet in the form of "pages," often comprising a "home page" relating to a general site and providing guidance and access to the contents at that site, the contents being contained in "sub-pages". A site includes a unique Internet Protocol address or Uniform Resource Locator (URL). The site can thus be accessed from any access point to the Internet by entering the relevant address and displaying the site held at that address. The user accesses the Internet via a client computer, for example, a personal computer linked to the Internet. The link will typically be via a modem and telephone line, and a service provider or server acts as intermediary, the client accessing the Internet via the server. In addition, the server allows the user to set up an Internet site. It will be appreciated that the server generally comprises a fixed station. Such an arrangement can give rise to an unnecessary level of inflexibility. In particular, it is often time consuming and unnecessarily complex to have to access the fixed station server to set up or access an Internet site.

Various developments to Internet related systems have been disclosed in various patents. For example, U.S. Pat. No. 5,550,984 relates to a security system for connecting computer networks, U.S. Pat. No. 5,544,162 relates to a bridge for connecting parallel processors to the external environment, U.S. Pat. No. 5,517,494 relates to a routing protocol for multicast messages across the Internet, U.S. Pat. No. 5,416,842 relates to message transmission between firewall servers, U.S. Pat. No. 5,410,754 relates to an interface between a wire line carrier and a remote host on a Local Area Network (LAN), U.S. Pat. No. 5,400,335 relates to an Integrated Services Digital Network (ISDN)—LAN connection terminal, U.S. Pat. No. 5,353,283 relates to packet transmission across a series of modes in a network, U.S. Pat. No. 5,351,237 relates to a network of LAN's connected to an ISDN including a plurality of routers/sub-routers, U.S. Pat. No. 5,309,437 relates to a bridge-type device for coupling segments of an extended LAN, U.S. Pat. No. 5,289,468 relates to a terminal adapter for connecting a LAN and a Wide Area Network (WAN) using an Internet Standard Protocol, U.S. Pat. No. 5,276,789 relates to graphically displaying computer network topology, U.S. Pat. No. 5,229,988 relates to a system for classifying duplicate source address replies, U.S. Pat. No. 5,185,860 relates to a system for determining the nodes connected to a computer network, U.S. Pat. No. 5,166,931 relates to a system for an internetwork arranged to simplify the network addressing system, and U.S. Pat. No. 5,442,633 relates to a method for routing a data packet between a mobile host and a destination host via a wireless link between the mobile host and a base station. The base station acts as a physical location of the mobile host and is linked to the network via a LAN sub-network.

The mechanism of file name translation across a distributed network is known, for example, from U.S. Pat. No. 5,483,652, incorporated herewith by reference.

A range of products has been developed by Spyglass Inc., enhancing the Internet connectivity of existing devices. In particular, these products are designed to connect electronic products to the worldwide web such as cellular phones, cable T.V. set-top boxes, televisions, personal digital assistants and pagers, providing the infrastructure, applications and services to allow these devices browsing capability across the Internet. One such product is available under the trademark REMOTE MOSAIC, which converts browsing into a client service operation in which lightweight "viewers" are custom-integrated into devices which connect to a "proxy browser" on a remote server. The proxy browser handles applications demanding excessive process or memory capabilities such as caching and connects the device to other servers.

In another aspect, there are numerous situations in which an instantaneous image of a scene or object is of considerable use and importance, for example, in insurance claims documentation where it is vital to document as accurately and completely as possible the circumstances against which the insurance claim is made. Conventionally, details are documented either in writing or by taking photographs using a film camera. This information is then subsequently entered with all other information relating to the insurance claim. Such a system is time consuming and error-prone, in particular because of the subsequent re-entry of information and transfer of the physical photograph to the relevant file. Similar problems arise, for example, in news coverage of an incident, police or other authorities' incident reports and so forth.

U.S. Pat. No. 5,583,994 relates to a multimedia information delivery network system. A wide area transmitter transmits the multimedia programs, which are received by a plurality of network servers for re-transmission to downstream network servers or a user. The programs are cached at the network servers as determined by a scheduler for efficient delivery of the multimedia program to each user.

In another aspect, data terminals connected to the Internet are conventionally required to download applets in an appropriate agent implementation language from a host, which is a complex and slow process.

SUMMARY OF THE INVENTION

Objects of the Invention

It is an object of the present invention to avoid, mitigate or overcome the problems associated with prior art arrangements.

It is a further object of the invention to provide an improved data device interconnection with a local area network.

FEATURES OF THE PRESENT INVENTION

According to the present invention, a method of providing access to a communications network to a user supporting a mobile unit capable of wireless communication with at least one access node of a local area network that is capable of connecting to the communications network, comprises a first step of initially establishing wireless communication between the mobile unit and said at least one access node by associating the mobile unit with said at least one access node; a second step of authenticating the user of the mobile unit to enable access to the communications network; and a third step of establishing communication with a destination on the communications network, and recording at least some session particulars of a communications session during which the mobile unit communicates with the destination on a server on the network.

The associating step is performed by transmitting an association request from the mobile unit to said at least one access node, and by receiving an association response from said at least one access node at the mobile unit. The authenticating step is performed by transmitting an authentication request from the mobile unit to the communications network via said at least one access node associated with the mobile unit, and by receiving an authentication response from the communications network at the mobile unit via said associated at least one access node. The step of transmitting the authentication request is initiated by manual action by the user, and validated at an authentication site in the communications network. Preferably, the manual action includes the step of passing a transaction card identifying the user across a card reader on the mobile unit.

In a preferred application, a plurality of access nodes of the local area network is positioned at spaced-apart locations throughout a venue in which suppliers of information content are situated. The authentication site validates the authentication request only for a limited number of the access nodes.

It is desirable when the access node is in wireless communication with the communications network. The recording step is performed by recording the session particulars at said at least one access node. The destination is a user-selectable database containing information content.

Another feature of the invention resides in manually selecting, at the mobile unit, a parameter of the communication with the destination. The parameter is selected from a group consisting of a session start time, a session stop time, a session duration, session quality of transmission, session usage, databases accessed, number of contacts, location of mobile unit, time of day, traffic class and category, encryption level, session protocol, packet loss, net throughput, transmit power, priority requested and priority granted.

One from a plurality of delivery channels along which information content from the destination is delivered to the mobile unit is determined. The delivered information content is displayed on the mobile unit. The delivery channels have different parameters. The user is asked to select a desired one of the parameters, and the desired one of the parameters is selected by the user. The parameters are at least one of bandwidth, data rate, quality of service, power output, power consumption, cost, traffic class or category, delivery channel characteristics, minimal signal to noise level, and minimal packet delay. Preferably, all the parameters on a display screen are displayed on the mobile unit prior to delivering the requested information content.

Still another feature resides in the step of measuring a remaining amount of time that the mobile unit is able to communicate with said at least one node, and the step of displaying the remaining amount of time on a display screen on the mobile unit. A total amount of time that the mobile unit has been in communication with said at least one node can also be displayed.

It is advantageous if the information content is encrypted prior to delivery. Paying for the delivery of information content is done by presenting the user with different terms of payment by displaying the payment terms on a display screen of the mobile unit. The user then selects one of the payment terms by transmitting a user code to a payment validation site having reference codes, and by validating the user code when the user code matches one of the reference codes.

In further accordance with this invention, a method of delivering information network services to a user supporting a mobile unit in a venue, comprises the steps of providing access nodes of a local area network throughout the venue, the mobile unit being capable of wireless communication with at least one node when located within an operating range therefrom, listening on at least one delivery channel to determine an identity of a wireless local area network protocol in use, configuring the mobile unit to establish wireless communication over said at least one delivery channel with said at least one node pursuant to the protocol, determining a level of authorization and credentials of the user, and delivering a predetermined set of the network services over said at least one delivery channel based on the determined level of authorization and credentials of the user. At least some session particulars of a communications session are recorded during which the network services are delivered on a server on the network. Content providers charge for use and for recording the session particulars.

BRIEF DESCRIPTION OF THE DRAWINGS

The foregoing objects and advantages of the present invention may be more readily understood by one skilled in the art with reference being had to the following detailed description of several preferred embodiments thereof, taken in conjunction with the accompanying drawings wherein like elements are designated by identical reference numerals throughout several view, and in which.

DETAILED DESCRIPTION OF THE PREFERRED EMBODIMENTS

Figure 1:
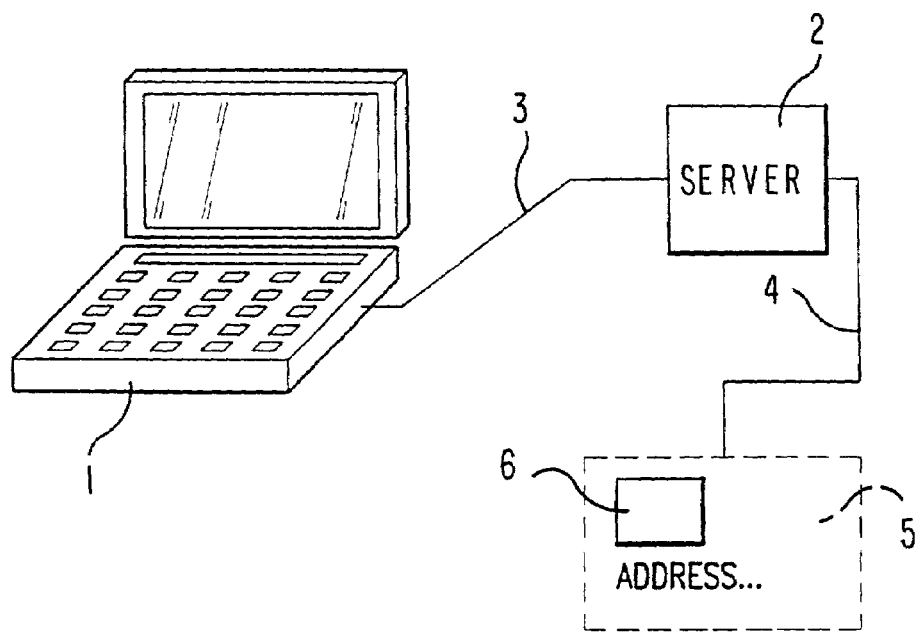
FIG. 1 shows a terminal according to the present invention arranged to link with the Internet.

A conventional Internet link is shown referring to the schematic diagram at FIG. 1 and the block diagram of FIG. 2, and includes a remote terminal data device 1 comprising, for example, a lap-top computer, a personal computer (PC) or a mobile unit, as discussed in more detail below, linked to a server 2 via a suitable link 3, which can be a telephone link incorporating a suitable modem, a wireless link, or a cellular telephone link, among other possibilities which will be evident to the skilled person. The server 2 is, in turn, interconnected via line 4 to the Internet shown schematically at 5. When the user wishes to access a web site, the web site address is entered at terminal 1, and server 2 brings up the web site 6 at the given address from the Internet 5. Similarly, when the user wishes to create a site, the relevant information is entered at terminal 1, and the site is created via server 2.

Figure 2:
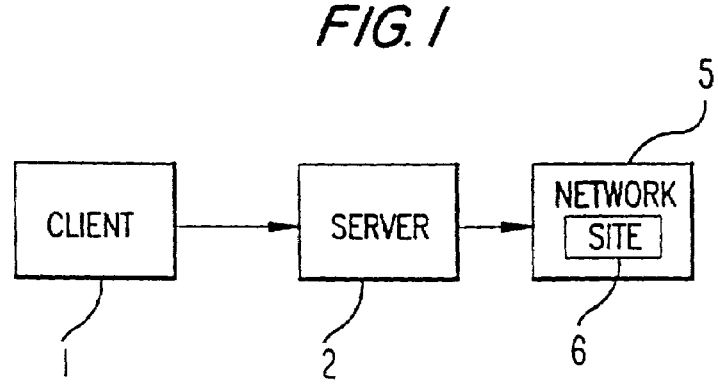
FIG. 2 shows a block diagram of the connection system shown at FIG. 1.

While the system shown in FIG. 1 allows centralized site access and creation, it will be appreciated in certain circumstances that the system is cumbersome, for example, where it is desired to create a site very quickly. In addition, whereas in some circumstances a user will simply know what information is sought, and will "browse" through the Internet to find a site containing that information, in some circumstances the user may be entirely aware of the exact site which he wishes to access irrespective of the information contained at the site. In that case, the centralized system shown in FIG. 1 can give rise to unnecessary delays.

Figure 3:
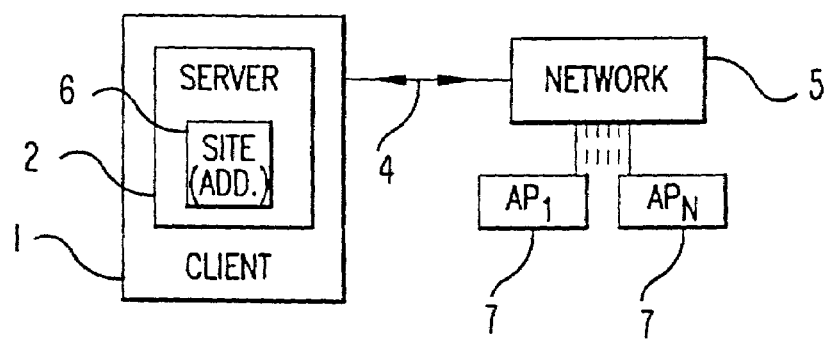
FIG. 3 shows an alternative configuration according to the present invention.

An improved system according to the present invention is shown as a block diagram in FIG. 3. Briefly, within the client terminal 1 itself, suitable server software 2 is retained. Accordingly, the client is able to create an Internet site directly, the Internet site 6 being stored at the server again directly at the terminal 1. The client/server then accesses the Internet 3 via a line or wireless link 4. As is well known, the Internet can be accessed generally by access points $AP_1$ to $AP_n$.

As a result, the invention allows an Internet site such as a web site to be set up at the terminal without the requirement of accessing a dedicated server, as appropriate server software is included at the client terminal. When a third party wishes to access the site, they will have or be able to obtain details of the client server address and can thus access the client server via the Internet.

A particular implementation of the invention arises in relation to client/servers provided in remote, mobile terminals communicating with the Internet via an access point with which it is in wireless communication. In that case, data is entered at the mobile unit, generally relating to the physical environment at which the mobile unit is presently located such as an image of the surrounding scene. Users wishing to access that data merely need the client/server address. The address is entered at the relevant access point to the Internet, and the site is pulled up directly from the client/server. It will be seen that the client/server can include a home page, which is actually pulled by the user, the specific sub-pages at the site being accessible via the home page, once the home page has been accessed.

Figure 5:
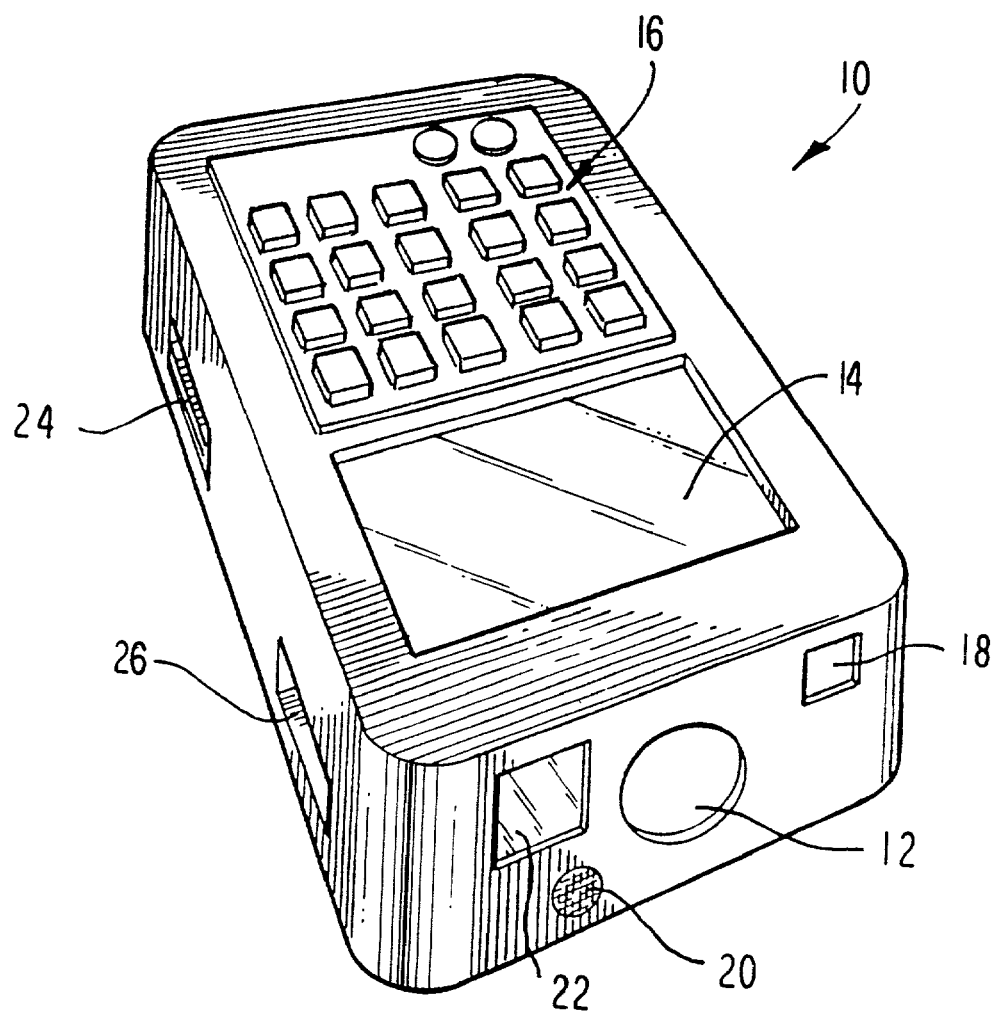
FIG. 5 is a perspective view of a data terminal according to the present invention.

The system can use a data terminal of the type designated generally 10 in FIG. 5. The central elements to the data terminal 10 comprise a digital camera having a lens 12 and a wireless Internet link 18.

Digital cameras are well known and the detailed structure will be apparent to the skilled man such that a detailed description is not required here. Briefly, however, the digital camera includes a lens system 12 for focusing an image onto a CCD (charge coupled device) array. The image is thus pixelized and encoded, for example, as a bit stream. The encoded signal is decoded and displayed on a visual display screen 14 or output as hard copy. A "still" image is obtained in the same manner but by recording an instantaneous image. The majority of the components of the digital camera is not shown in FIG. 5 for the purposes of clarity. A CCD camera is preferable over, say, a laser camera as images can be recorded from a greater distance.

The data terminal 10 further comprises a keyboard 16. In order to record an image, the lens 12 of the data terminal 10 is directed at the scene to be recorded. This is preferably displayed on the visual display screen 14. When a desired image is isolated, a button, for example, on the keyboard 16 is pressed, and a still image recorded.

In the embodiment shown, the data terminal 10 further includes various optional and required components. The principal required component is a wireless signal transmitter 18 which, as discussed in more detail below, relays the recorded image to a remote access point for distribution from that point. Optionally, the data terminal 10 further includes a microphone 20 for recording, for example, a verbal description of the recorded scene, a bar code reader 22 allowing alternative or complementary operation of the data terminal 10, a physical interface 24 for downloading of information stored in the data terminal 10 to a terminal to which it is connected by cable or other link, and a printer output slot for outputting a hard copy of the image, additional information, or as discussed in more detail below, a bar code symbol representative of the stored image. In addition, as discussed above, the terminal further includes server software allowing creation of a web site at the terminal. The web site can contain, for example, recorded images or sounds from the environment of the terminal together with text input at the keyboard and/or the user's recorded verbal commentary. A further feature that can be incorporated into the terminal is a global positioning system (GPS) of a known type. The GPS communicates with GPS satellites via a suitable antenna (not shown). As a result, the specific geographical location of the mobile device can be immediately ascertained. This can be provided as additional information broadcast by the device and can also be used by a central tracking system to ascertain where all the devices are at a given time.

Once again, specific details of the various individual components will be well known to the skilled reader and, for the purposes of clarity, are not repeated here.

In order to minimize costs, the network architecture is designed to minimize the amount of data traffic over the highest cost communication links. This can be done, for example, by selecting a communication route which utilizes the cheapest available lines. Where this can lead to delay, a prioritization system can be introduced ensuring that communication, in respect of which delay is unimportant, can be sent on a cost optimized basis, whereas those signals for which the speed of transmission is important are sent on an urgency basis. For example, where wireless communication gives rise to high costs as against physical interface communication, low priority information can be downloaded physically from the terminal to a cradle to reduce the power and processing burden and general cost burden.

An alternative terminal configuration can be based on the arrangement disclosed in U.S. patent application Ser. No. 08/691,263, filed Aug. 2, 1996, assigned herewith. That application describes a modular type terminal having interchangeable data collection modules, together with a detailed discussion of communications between mobile units and the Internet.

The system can be used for coverage of news events. A journalist holding the terminal can store images of a news event, and record a report on the event. A web site can be instantaneously set up at the terminal via the internal server holding the report and other data. Accordingly, a user wishing to find out about the news event merely needs to access the site via the network. The address could be known to the user or could be available from a central site on the Internet disclosing where various mobile units are located, and providing their site addresses. It will be seen that the technology could further incorporate a pay-per-view type system whereby the user is automatically billed for accessing the site. It will be seen that many other applications can be envisaged. For example, a police report of the scene of an incident, or an insurance operative report can be accessed actually on location at the incident, rather than relying on transfer to a stand-alone server for creation of a web site at that level.

According to the embodiment, any suitable form of wireless communication between the client/server and the Internet can be utilized. Such systems are well known for roaming units, whereby access points to the Internet arranged to receive communications from mobile units are located at various geographical points. Known algorithms can be used for selecting which access point is the most suitable. The communication can itself be by radio waves or an optical link such as an IRDA Standard Protocol. It will be seen that another of the advantages of the system is that the site is stored at the terminal and need only be downloaded on demand via the wireless link, thus reducing the cost that would be incurred by transferring data continuously. Data that is never requested can be transferred over a less costly connection at a later time.

Figure 4:
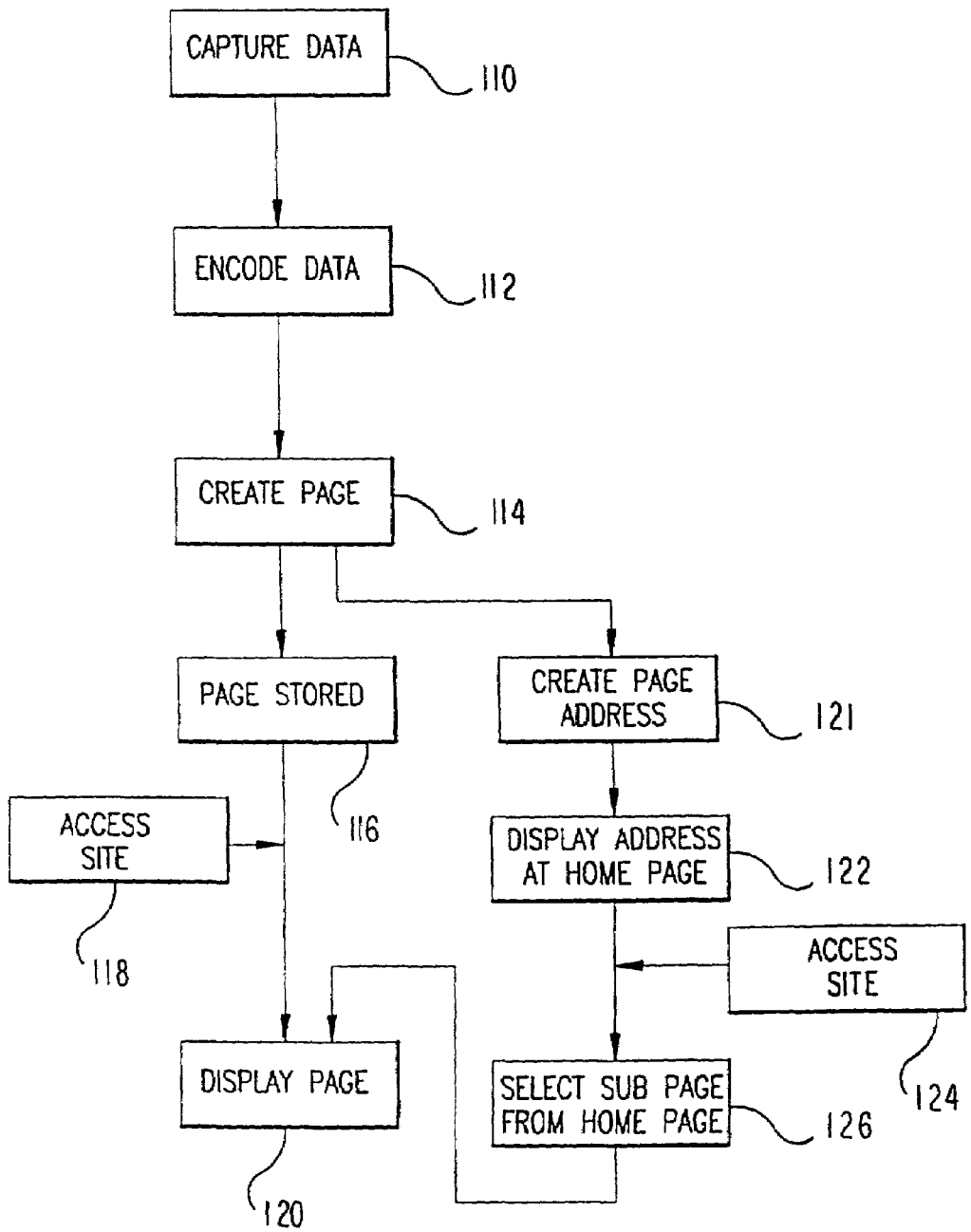
FIG. 4 is a flow diagram representing operation of the present invention.

Referring to FIG. 4, a flow chart of the operation of the terminal 1 is shown. At step 110 the desired data, for example, an image or an audio recording is captured. The data is then encoded at step 112 into a suitable format to be rendered as a web page, for example, by creating a bit map. At step 114 the encoded data is processed to create a suitable web page according to the desired format, as determined by the server software and any user input. The process can then branch to step 116 where the page is stored at the terminal. When a page access request is received at 118 by a remote user, who called up the known address for the terminal, the page is displayed at the terminal web site. According to an enhanced system, the process branches at 114, also allowing a specific page address to be created for the particular data stored in the given process, at step 120. The address and details of the page stored at the address are displayed on a home page at step 122. This allows a menu to be created for the terminal such that more than one page is available. Accordingly, when the site is accessed at 124 by a remote user, the remote user has the option of selecting the relevant sub-page displayed at the home page at step 126, allowing display of any desired page, returning to step 120. The system thus allows quick and easy operation with no programming required, and in particular, no HTML requirement. An instantaneous web page can be set up using the server software, the image to be displayed being stored simply by pointing the terminal at it and "clicking". Once again, the system can be designed with cost optimization in mind, ensuring that a minimum amount of data traffic occupies high-cost communication links.

Figure 6:
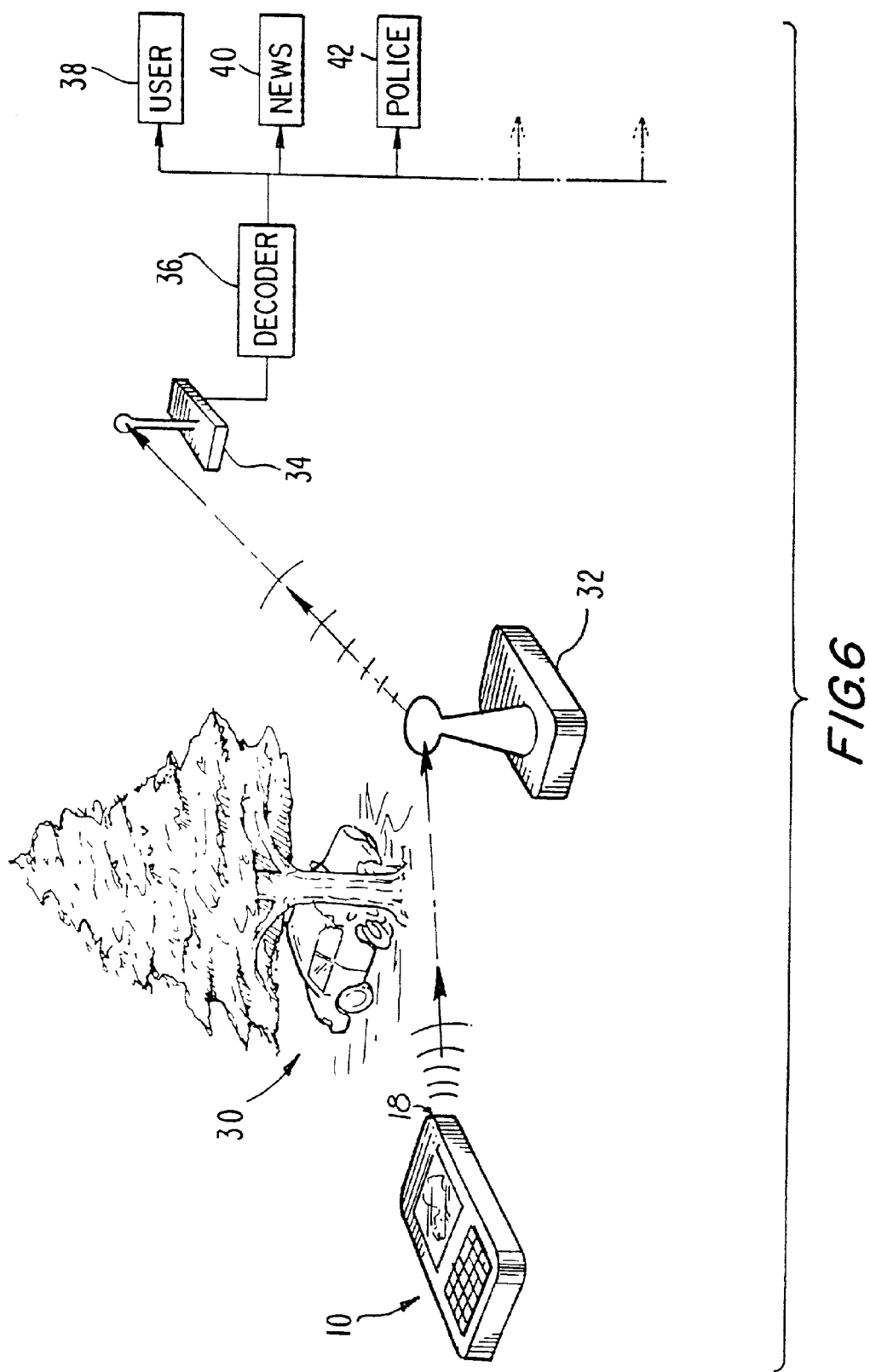
FIG. 6 shows an implementation of the data terminal according to the present invention.

Referring to FIG. 6, one possible implementation of an alternative embodiment of the present invention is shown. Where, for example, the police or other authorities, or an insurance operative wish to record details of a scene shown generally at 30, the image is captured as a still digital camera image by the data terminal 10 in the manner discussed above. The stored image is encoded, for example, as a bit stream, and the bit stream is transmitted or relayed via the transmitter 18 to a remote point.

In the embodiment shown, the image information is relayed from transmitter 18 to an intermediate booster transmitter 32. This can either be one of a network spread across an area or can, for example, be carried in the data terminal user's vehicle or a carrying case. The use of a booster transmitter 32 reduces the broadcast power requirements of the data terminal 10 allowing more space to be dedicated to data storage/processing means or accessories, and increasing the battery life. It will be appreciated that the booster transmitter is, however, optional and, in many cases, will not be required. Transmission can take place via an RF wireless link, microwave or other suitable wireless communication method. Where the vehicle is part of a larger GPS monitored tracking system, the arrangement of the present invention can be a module incorporated into the system.

Either the transmitter 18 in the data terminal 10 or the booster transmitter 32 relays the image information to an access point 34 including a receiver for receiving the relayed information signal. The received signal is input to a processor/data storage/decoder device 36. The image can then be transferred to any desired device, for example, a central data storage device for the user to access on return to his premises (for example, an Intranet or LAN), or a news and information network (such as the Internet) where it is desired to broadcast the image, or to a police or other authorities'information database where it is desired to record and document the image. The transmitted signal from the data terminal 10 may also include information such as the desired destination of the image, additional information relating to the circumstances, encoded information representative of recordings of any verbal messages, or recordings of sound messages further explaining the circumstances as recorded by the microphone 20. Information relating to the circumstances, or the destination of the image, can be input via keyboard 16.

Where the web page is created on site at the terminal using an internal server, the transmission system described above can equally be used for third party access to the web page.

Figure 7:
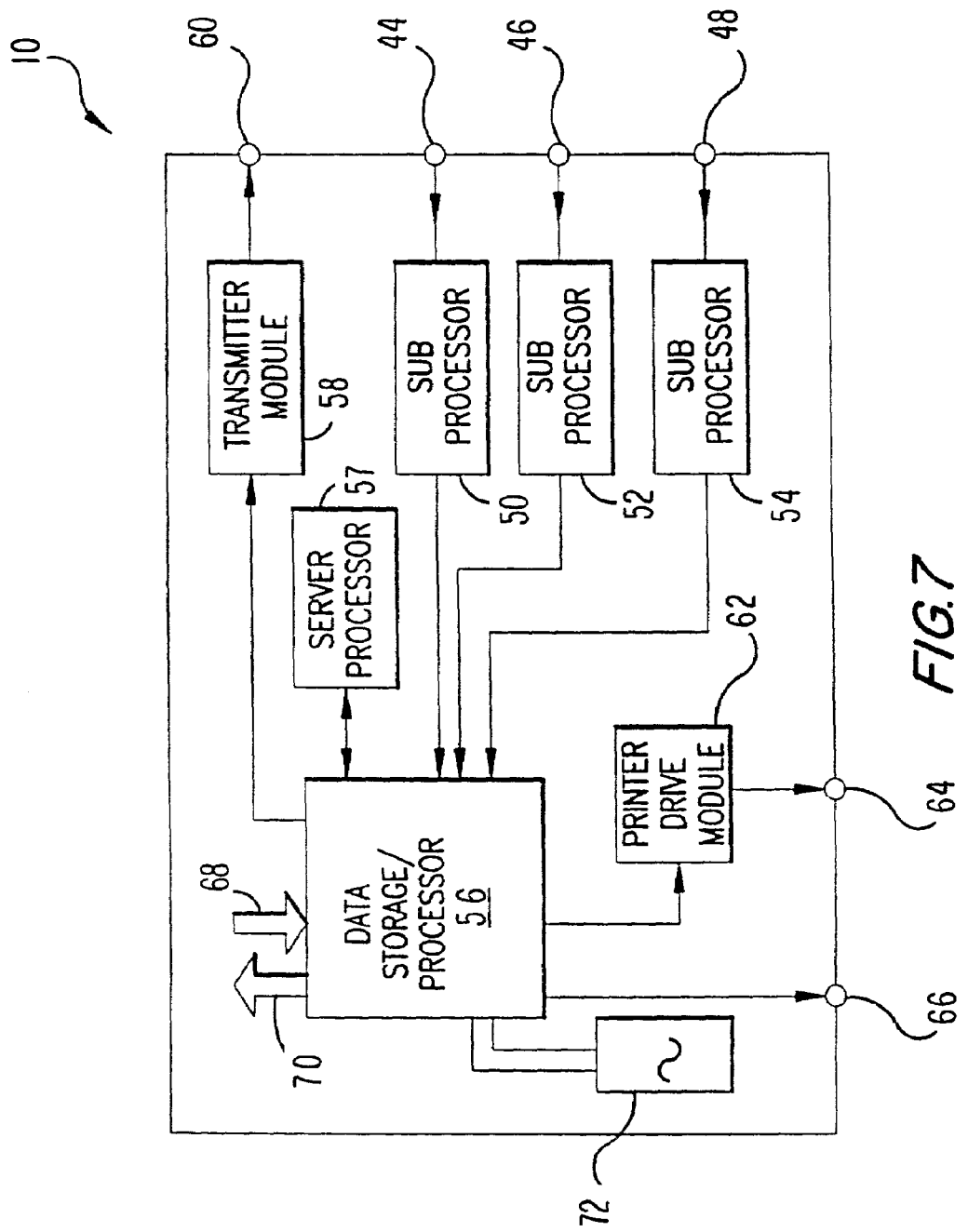
FIG. 7 is a block diagram showing components of the data terminal of FIG. 5.

A block diagram showing the components of the data terminal 10 is illustrated in FIG. 7. The data terminal includes various inputs comprising suitable transducers for converting the input signals to electronic signals. The inputs include the digital camera input 44 including a CCD array transducer, an audio signal input 46 including a microphone transducer, and a bar code symbol signal input 48 including, for example, a CCD array. Each of the signals is input to an encoding or digitizing sub-processor respectively 50,52,54, and the processed signal from each sub-processor is transferred to a data storage and processing device 56. The data is stored, processed and relayed as appropriate to various outputs. Data relating to the image captured by the digital camera 44 and, as appropriate, any bar code data or audio data is transferred to a transmitter module 58 and is transmitted as described above at output 60. A hard copy of the still image, or, as discussed below, a bar code symbol representative thereof is output via printer drive module 62 and output 64. Where it is desired to download stored information via a physical interface, this is done at output 66. In addition, the data store/processor 56 receives information input to the keyboard 16 via a line 68 and sends the image from the digital camera input 44 to the visual display screen 14 via line 70. The system as a whole is powered by power supply 72, for example, a battery. Where the terminal is configured to create a web page on site, a server can be incorporated in hardware (or software, or a combination of hardware and software) as shown at 57.

Accordingly, it will be seen that, in one aspect, the image data can be captured automatically and transmitted to a common database accessible to authorized users. The images could be transported and/or accessed via video servers, collaborative work group software and distributed multimedia, and implemented by desktop video teleconferencing. Processing of the image can be carried out on the raw data once it has been transmitted to the main network, allowing a further reduction in the processing requirements and, hence, the power and space requirements for the data terminal itself.

A particular advantage of using a digital camera is that the image can be stored at high to medium resolution and transmitted electronically with a minimum of intermediate processing.

It will be seen that a wide range of applications are available, in particular, relating to industries generally in which photographic (digital) images are regularly taken in the field. An alternative to the insurance claims documentation application discussed above, where bids/estimates were involved, the item in respect of which the bid/estimate is provided, documenting, for example, the work required on the basis of which the bid or estimate was based, could be recorded. Similarly, where repair work or improvement work was contemplated, an appraisal could be made taking into account stored images. The system could be used as a general aid to documentation of items or circumstances. As discussed above, the system could be implemented in law enforcement. For example, the scene of a crime or an accident could be stored and relayed, or accessed. Indeed, felons could be photographed and the image compared against a suitable database for identification purposes using known image comparison techniques. The system can also be used as a preliminary aid to more exhaustive documentation of circumstances such as proofing and/or test shots. The data is preferably relayed as determined by a network architecture designed to reduce transmission costs by minimizing transmissions over high-cost communication links.

As will be seen for all of the above possible applications and all other applications, the system includes particular and significant advantages, in particular providing immediate access to images for third parties privy to the image distribution network, providing access to all users simultaneously as desired, expediting processing time (as a result of immediate accessing), improving accuracy and/or efficiency, as a result of the availability of more precise information in particular in high resolution implementations, and associated cost savings in particular resulting from decreased processing time and improved accuracy.

Yet a further possible implementation of the arrangement would be as a remote fire alarm or smoke detector. A terminal including the basic components of a digital camera or other image recordal means and network connectivity can be permanently or detachably mounted at a zone where it is desired to monitor for fire, smoke, poisonous gases, or any other such hazard. The terminal further includes a hazard detector of any suitable type such as a smoke detector, a heat detector, a noxious substance detector or other. All these detectors are well known to the skilled man and do not require further description here. In the case, for example, of a fire alarm terminal, when a heat detector detects that the ambient temperature has risen over a preset limit, the terminal is activated to capture a still or moving image of the scene. At the same time, the terminal notifies the relevant authorities such as the fire services, and the image is transmitted in a manner discussed above to an access point at the fire station. Accordingly, the scene can be reviewed and it can be assessed whether a true fire risk exists or whether other activity to which the increase in temperature is attributable can be detected such as cooking activity. As a result, false alarms can be to a large extent avoided. It will be seen that a similar approach can be adopted for other hazard detectors, where an image of the scene is transmitted to suitable authorities when a potential risk is first detected for further assessment before full mobilization.

A further implementation for which the system of the present invention according to a further aspect would be particularly suited and which would benefit from the advantages discussed above is in the field of goods transfer, for example, parcel delivery. When a damaged parcel is received, there is no way to know immediately the condition of the parcel when shipped. The system of the present invention would, however, be able to acquire the image and transmit it to a remote location or create a suitable web page on site. The image could then be accessed at the receiving depot and compared with the actual received parcel to establish whether the condition had changed in any way. An alternative option would be to print the image information in a bar code format, the bar code itself being attached to the parcel itself. The bar code symbol could be decoded at the receiving depot, once again to compare the image with the received parcel. Evidently, a high resolution bar code symbol will be required, for example, under protocol PDF 417. The reader shown in FIG. 5 includes the capability for such an arrangement including a printer and printer slot 26.

Figure 8:
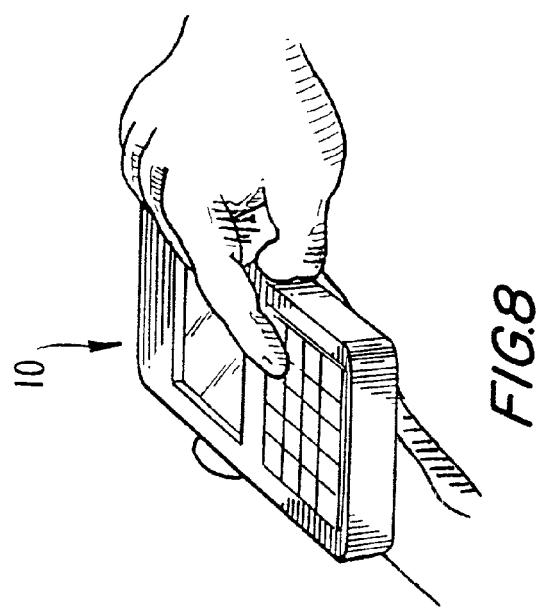
FIG. 8 shows a hand-held data terminal.

It will be appreciated that the embodiments described above relate to specific possible implementation of the invention, and that the invention embraces a number of alternatives. For example, as shown in FIG. 8, the data terminal 10 is configured with ergonomic considerations in mind, fitting comfortably into the palm of the user's hand. As a result, the data terminal 10 can be quickly and accurately directed towards an image to be recorded, using the visual display screen to ensure that the image is as desired. At the same time, the keyboard can be manipulated comfortably using the user's other hand to capture the image, input additional information and so forth. Alternatively, the terminal may be in the form of a conventional camera, or a video camera, or any other appropriate configuration allowing image capture, and, preferably, data input.

The digital camera preferably includes auto focus capabilities and manual zoom capabilities with a separate button/trigger for zooming, which button/trigger may form part of the keyboard or may be provided separately. The manual zoom feature will assist in taking close-ups of the subject to be imaged. As mentioned above, a printer, for example, a low density, low quality printer can be included in the data terminal, or provided as an add-on, so that a hard copy of the image is available in the field. As also discussed above, the image could be printed in PDF 417 format for subsequent decoding.

Figure 11:
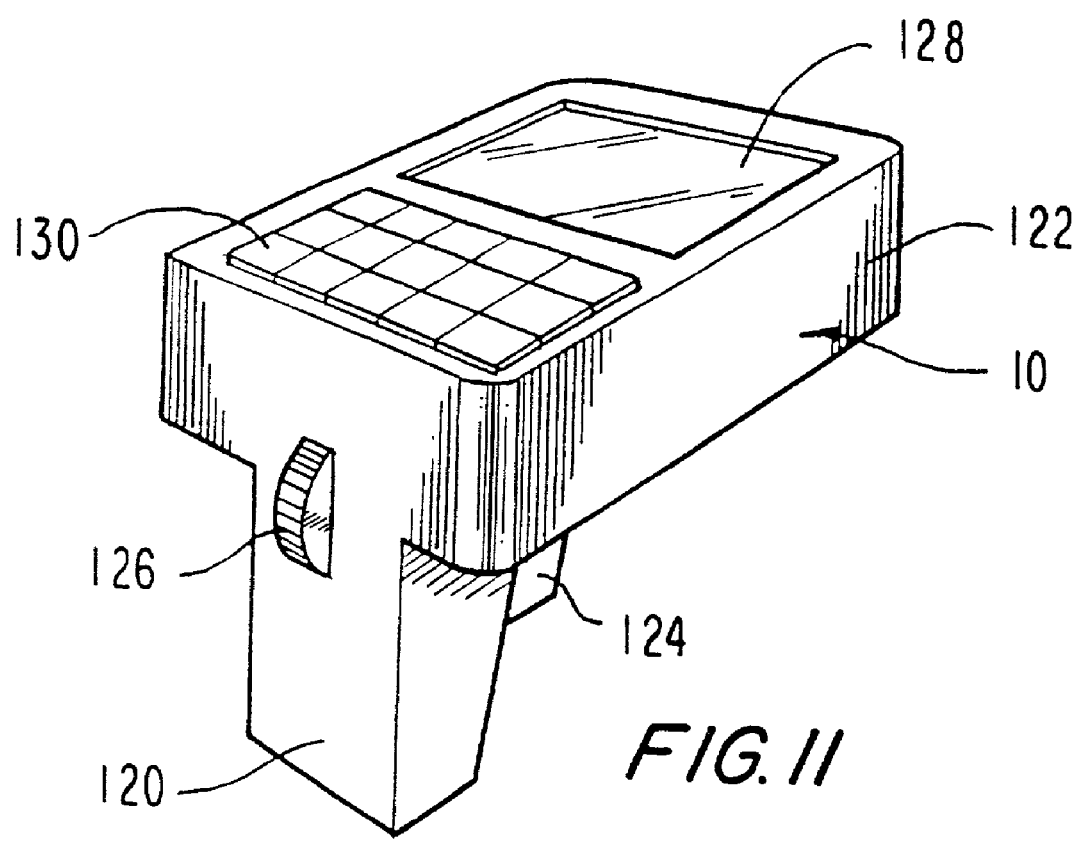
FIG. 11 shows an alternative configuration for the terminal of FIG. 8.

FIG. 11 shows an alternative configuration for a data terminal. The terminal 10 contains generally all of the components discussed in relation to the other embodiments herein. However, the terminal 10 is configured in a "point and shoot" design and includes a grip portion 120 and a barrel portion 122. The grip portion is configured to sit comfortably and easily, with optimum balance, in the user's hand and further carries a trigger 124 and a thumb wheel 126. A display 128 and optional keypad 130 are provided on the upper face of the barrel portion 122 to allow easy viewing and input access to the user. The camera lens or other image recordal means are provided on the front face of the barrel portion 122 (not shown) allowing the user simply to point the terminal 10 in the direction it is desired to record in. When the desired scene is viewed on a display 128, capture is effected by activation of the trigger 124. Zoom can be controlled by the thumb wheel 126, which is preferably located for optimum ease of use by the user's thumb when the grip portion 120 is held by the user.

Figure 9:
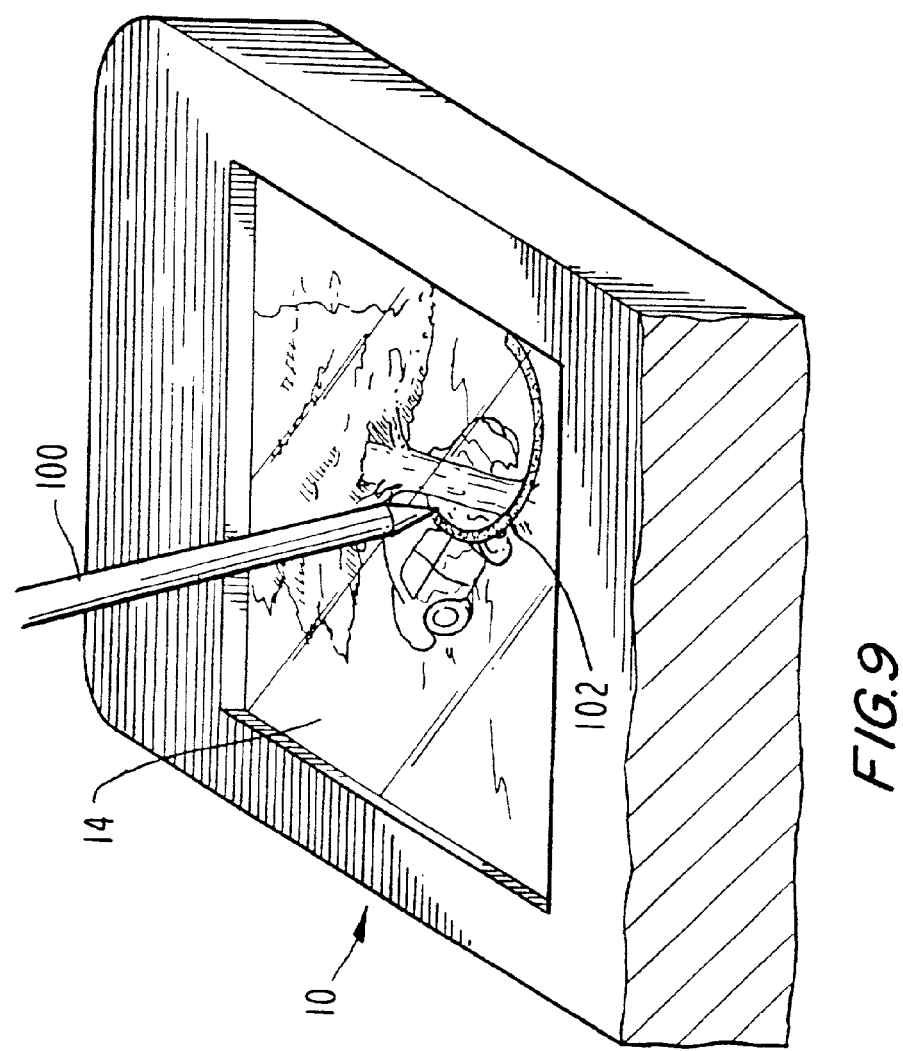
FIG. 9 is a detail of a data terminal according to the present invention having highlighting capabilities.

The processing speed and storage capabilities of the components of the data terminal can, of course, be determined according to the eventual cost of the system, for example, a slower and, hence, cheaper microprocessor can be incorporated. For more high-end applications, the data terminal could additionally include an SRAM card to store the still images. In addition, the visual display screen 14 can, as shown in FIG. 9, include LCD (liquid crystal display) capabilities. Accordingly, using a suitable pen 100, the image can he altered, for example, by ringing or otherwise highlighting areas of interest, the alterations being represented on the LCD display as 102 in FIG. 9. The alterations can be deleted or revised additionally using the keyboard as appropriate.

The range of implementations and the speed and efficiency of the system can be further enhanced by also incorporating bar code reader capabilities into, or in conjunction with, the data terminal. The construction and applications of bar code readers will be well known to the skilled man and do not require a detailed description here. Briefly, however, a bar code symbol comprises one or more rows of light and dark regions, typically in the form of rectangles or, for the case of two-dimensional codes, in the form of a two-dimensional array of light and dark spaces. The dimensions of the dark and light regions indicate encoded information to be read. A bar code symbol reader illuminates the symbol using reading beam generating means and senses light reflective on the coded regions using reading beam detecting means to detect the dimensions of the coded regions. A decoder decodes the detected encoded information. Known symbols include, for example, UPC/EAN, Coder 128, Codabar and Interleaved 2 of 5.

One known type of bar code reader comprises a data wand as disclosed in U.S. Pat. No. 4,471,218, incorporated herein by reference.

Figure 10:
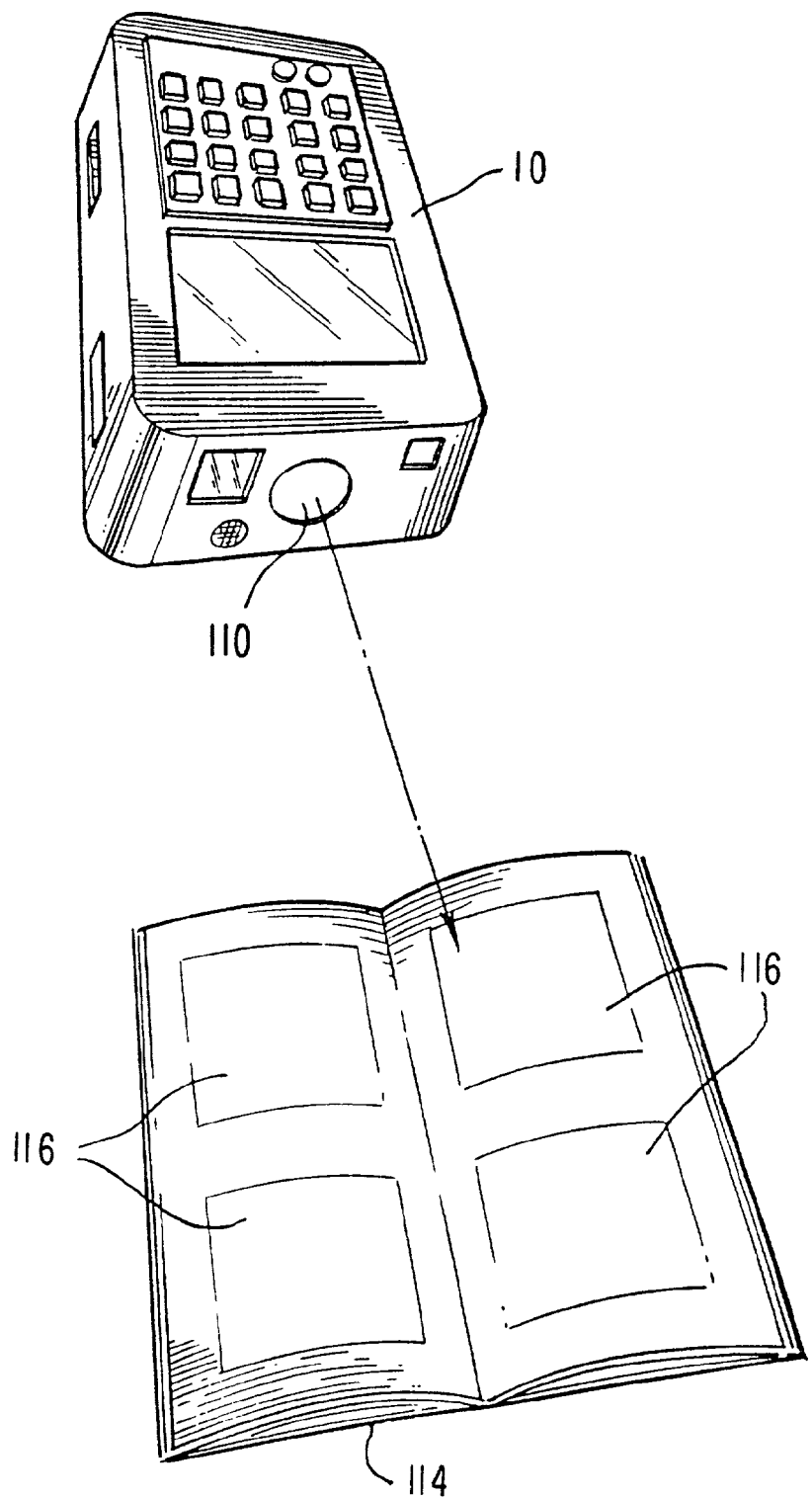
FIG. 10 shows a data terminal according to another aspect of the invention.

FIG. 10 shows a data terminal 10 of the type described herein above further incorporating an optical reader 110 incorporated in the data terminal 10. The reader 110 includes reading beam generating and detecting means, and the data terminal 10 includes processing means for decoding the detected encoded information. The reader 110 may comprise either a "flying-spot" laser scanner including means for scanning the reading beam or a "field of view" optical reader including a CCD array as detector. Both types of reader will be well known to the skilled reader, and a full description of the components and operation is not provided here.

It will be appreciated that a wide range of implementations can be envisaged for the data terminal 10 shown in FIG. 10. In particular, it may be useful in many circumstances to be able to read information encoded in bar codes to adduce additional information to that retrieved by the data terminal from the external environment.

A particularly advantageous embodiment is shown in FIG. 10. In particular, a book or other printed matter 114 is provided and can be carried by the user, including printed bar codes 116 which are read by the reader 110, and the information contained therein utilized by the data terminal 10. As discussed in more detail below, the data terminal 10, in fact, comprises an Internet server capable of creating a web site at the data terminal carrying, for example, information relating to the external environment around the data terminal for access by users elsewhere on the Internet. In such circumstances, the terminal might conventionally wish to download executable code from a host machine using an agent implementation language such as Java (a trademark). This system can be cumbersome and time consuming in view of the level of communications required between the client and the host. The present invention solves this problem by storing the executable code (applets) in the form of two-dimensional, high-density bar codes 116 in the book 114. Each bar code symbol 116 is identified by a suitable short title or other identifying information in the book. When it is required to access an applet, the user is merely required to read the two-dimensional bar code using the bar code reader 110, and the executable code is immediately downloaded to the data terminal 10 for the data terminal 10 to use it as appropriate.

The invention allows the user to carry a conventional book, for example, having five hundred pages of 2-D applet codes. Such a book would not be cumbersome and would indeed be attractive to many users. The system allows greatly accelerated downloading of applets in as little as fifteen seconds. Conventional downloading systems would still be waiting for connection to the host in that range of time scale.

It will be appreciated that any suitable executable code could be stored in a desired language in the two-dimensional bar codes 116. A wide range of different applets could, of course, be stored according to this system and indexed appropriately. Indeed, the system could be used for fixed or dedicated clients, as well as the remote mobile client data terminal shown in FIG. 10.

It will be seen that the data terminal can communicate with any suitable data network, for example, an access point to the Internet, or to a closed dedicated system relating to the user or to which the user subscribes, together with other users. Communication can be by way of RF communication or, if appropriate, infrared or microwave communication, or any other suitable wireless communication method.

Figure 12:
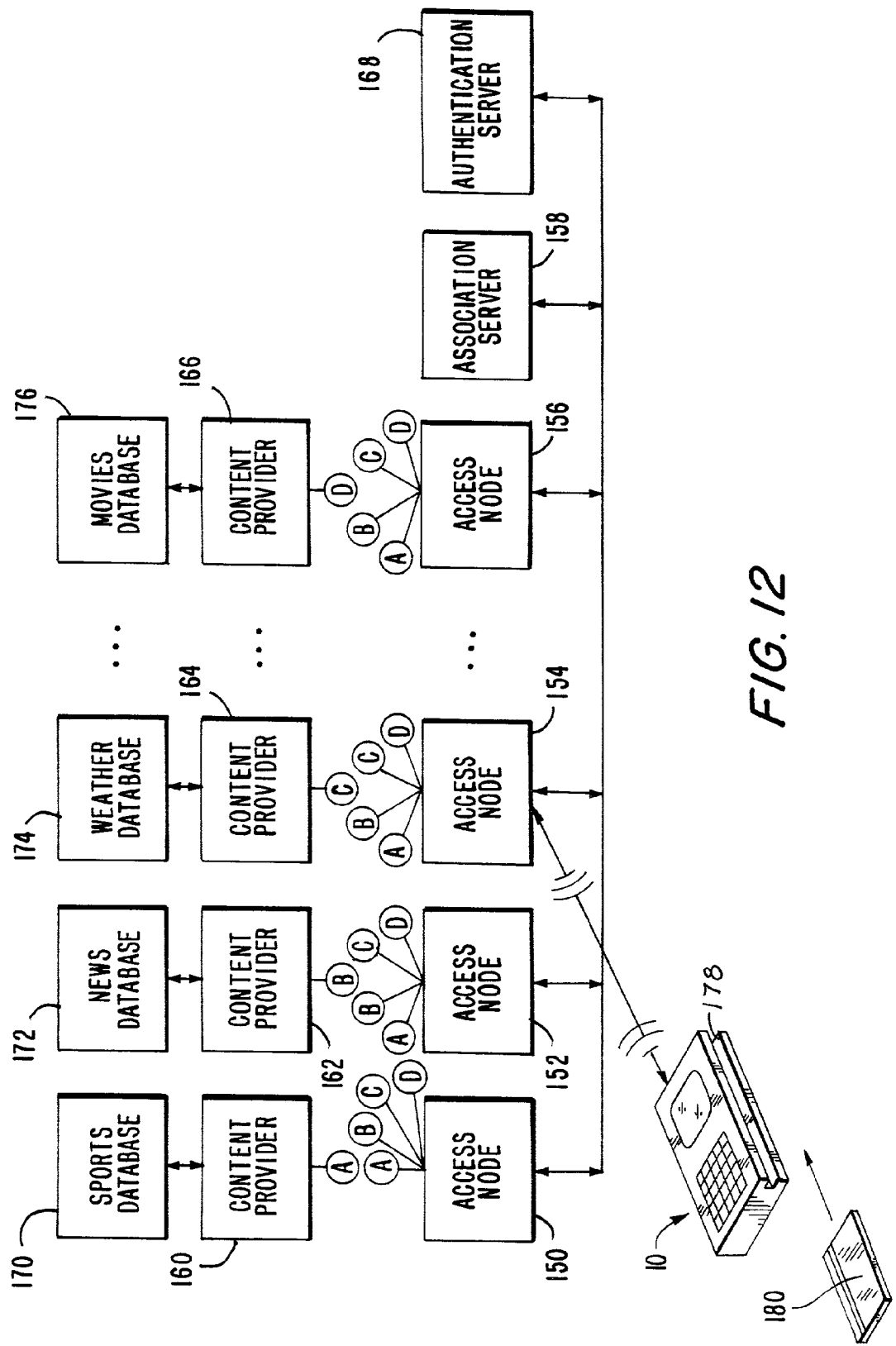
FIG. 12 shows a communications network with wireless gateways for mobile terminal access.

Thus, as shown in FIG. 12, the mobile, wireless data terminal 10 carried by a user is capable of bidirectional wireless communication with at least one access point or node of a plurality of access nodes 150, 152, 154 . . . 156 of a local area network (LAN). The access nodes are arranged throughout a venue, preferably a public space where individuals are invited to enter, such as a mall, a hotel, an airport, a sports arena, a trade show, a library, an office, a corporate lobby and the like. The access nodes are arranged for maximum roaming communications coverage so that the terminal 10 carried by an individual passing through the venue can reliably communicate with a first access node, and then with another access node when the terminal is out of range of the first node, and so on.

Each access node is capable of wired or wireless communication with at least one content provider, and preferably a plurality of content providers 160, 162, 164 . . . 166. Each content provider maintains a database of goods and/or services. By way of example, sports, news, weather and movies databases 170, 172, 174 . . . 176 are respectively accessed by providers 160, 162, 164 . . . 166.

Thus, terminal 10 can communicate with any node which serves as a wireless gateway to any of the databases, thereby enabling the user of the terminal to gain access to any of these resources. One or more of the access nodes may be maintained by individual wireless service providers (WSP), for example, local or long distance telephone companies who maintain billing services to which access to the above described resources can be conveniently charged and billed.

Wireless communication is initially established by associating the terminal 10 with one of the access nodes. The terminal transmits as association request to the access node and, in turn, to an association server 158 that is connected to all the nodes. The association server 158, in response, transmits an association response to the access node and, in turn, to the terminal.

Next, the user of the terminal needs to be authenticated. The terminal transmits an authentication request to the access node and, in turn, to an authentication server 168 that is connected to all the nodes. The authentication server 168 responsively transmits an authentication response to the access node and, in turn, to the terminal. The user manually initiates the authentication request, and the authentication server 168 validates the authentication request. Typically, the user presents a credit card 180, smart card or like token to the terminal which, in turn, reads and processes the token for validation by the authentication server 168. For this purpose, the terminal has a slot 178 and a magnetic stripe reader. The reader reads a magnetic stripe on the card as the card is slid along the slot. This process identifies the user of the terminal, and may result in the determination of additional information required to access the network, such as ESSID or encryption keys.

The token may be limited to a single retail store or a single credit card service. In this case, authentication is processed by a subset of all the access nodes.

Before a communication session is established with a destination, i.e., one of the databases, the terminal presents the user with a list of preset choices of various parameters relevant to the communication session, and the user is required to select at least one of the parameter choices. The list includes one or more of the following parameters: start of communications session, end of communications session, duration of session, quality of session, usage, number of databases, identity of databases, location of terminal, time of day, traffic class and category, encryption level, protocol, data packet loss, net throughput, channel, operating characteristics of the channel, data rate, minimal signal to noise ratio, minimal packet delay, transmit power level, priority requested, priority granted, bandwidth, speed, power consumption, and cost of each channel to a database. The user's selection dictates the quality and cost of the session.

During the communications session the terminal will measure the remaining air time for the session and alert the user with a visual reminder on the display or with an auditory warning by an on-board beeper.

During the session, the session particulars are recorded at the access node and may be made available at the terminal after the session. For example, a report can be generated to provide the cost breakdown of the session for each WSP.

The wireless transmission of data, especially personal and financial data, requires encryption, such as public key cryptography.

Another authentication technique resides in a payment validation system which uses two codes. Once the user selects a form of payment, the user is prompted to enter a first security code on the terminal keyboard. This first code is validated by comparison to a second security code stored in a remote database. Payment is initiated once the first code has been validated.

Payment can also be made in response to a bill sent by the WSP. This requires the user to have established an account in advance.

In a preferred embodiment, the overall system comprises a large corporate/business network with wireless gateways for mobile terminal access. This network can track resource usage and calculate excess bandwidth. This bandwidth can be "leased" to visiting mobile computers using wireless networking, or to other companies.

In one application, a company lobby has two wireless access points available. When a visitor arrives and wishes to lease network resources, he can connect to a limited access, low-security (with regard to corporate network) access point with default ESSID and be provided a DHCP-assigned temporary IP address. Using a web browser, the visitor can view a page that displays the network resources that can be leased at that location. Included in this would be several choices of network access, with pricing according to the performance required. The visitor may, at this point, opt to lease some network time to check e-mail, or other network-related activities.

The act of leasing network time would be as follows: the visitor will enter in some personal information, over secure sockets, required to complete a financial exchange (account, PIN, etc.). Once the transaction has been verified, the visitor will be transitioned to another wireless network access point that will provide the agreed upon service. The system will monitor the time and resources used and prorate the cost to the visitor. Since the system is monitoring the network activity, it can make smart choices as to the medium used to perform the function requested. At the expiration of the service, the visitor can request more time for a fee. The other wireless network access point that the visitor was transitioned to will have a different ESSID, only accept the visitor's IEEE (MAC) address, and utilize all the high security features available to maintain system integrity. If it is not already clear, this visitor would not have access to features of the corporate network intended only for approved entities.

This concept could be expanded to conference rooms or centers. Also this system preferably uses the IEEE 802.11b wireless network system protocol, but could be implemented using another wireless network protocol, such as Bluetooth.

It will be appreciated that any of the features discussed in relation to one embodiment can, as appropriate, be incorporated in any other embodiment without departing from the teaching of the present invention.

Without further analysis, the foregoing will so fully reveal the gist of the present invention that others can readily adapt to various applications without omitting features that, from the standpoint of prior art, fairly constitute essential characteristics of the generic or specific aspects of the invention and, therefore, such adaptations should and are intended to be comprehended within the meaning and range of equivalents of the following claims.

We claim:

1. A method of providing access to a communications network to users traveling through a venue, comprising the steps of:
   a) enabling each user to carry a portable, mobile unit having a wireless transceiver and a display;
   b) positioning a plurality of access nodes of a local area network at fixed, spaced-apart locations throughout the venue, each access node being in communication with different content providers each having a content database offered at the venue, each access node having a wireless transceiver in wireless communication with the transceiver in the mobile unit when the user is in proximity with a respective access node;
   c) initially establishing wireless communication between the mobile unit and the respective access node by associating the mobile unit with the respective access node;
   d) authenticating the user of the mobile unit to enable access to the communications network; and
   e) establishing communication with a respective content provider on the communications network by accessing a respective content database and retrieving content therefrom for presentation at the display of the mobile unit, and recording at least some session particulars of a communications session on a server on the communications network during which the mobile unit communicates with the respective content provider.

2. The method of claim 1, wherein the associating step is performed by transmitting an association request from the mobile unit to the respective access node, and by receiving an association response from the respective access node at the mobile unit.

3. The method of claim 2, wherein the authenticating step is performed by transmitting an authentication request from the mobile unit to the communications network via the respective access node associated with the mobile unit, and by receiving an authentication response from the communications network at the mobile unit via said associated respective node.

4. The method of claim 3, wherein the step of transmitting the authentication request is initiated by manual action by the user, and validated at an authentication site in the communications network.

5. The method of claim 4, wherein the manual action includes the step of passing a transaction card identifying the user across a card reader on the mobile unit.

6. The method of claim 4, wherein an authentication site validates the authentication request only for a limited number of the access nodes.

7. The method of claim 1, wherein the recording step is performed by recording the session particulars at the respective access node.

8. The method of claim 1; and further comprising a step of manually selecting, at the mobile unit, a parameter of the communication with the respective content provider.

9. The method of claim 8, wherein the parameter is selected from a group consisting of a session start time, a session stop time, a session duration, session quality of transmission, session usage, databases accessed, number of contacts, location of mobile unit, time of day, traffic class and category, encryption level, session protocol, packet loss, net throughput, transmit power, priority requested and priority granted.

10. The method of claim 1; and further comprising a step of determining one from a plurality of delivery channels along which information content from the respective content provider is delivered to the mobile unit, and a step of displaying the delivered information content on the mobile unit.

11. The method of claim 10, wherein the delivery channels have different parameters, and wherein the determining step includes a step of asking the user to select a desired one of the parameters, and a step of selecting the desired one of the parameters by the user.

12. The method of claim 11, wherein the parameters are at least one of bandwidth, data rate, quality of service, power output, power consumption, cost, traffic class or category, delivery channel characteristics, minimal signal to noise level, and minimal packet delay.

13. The method of claim 11, wherein the asking step includes a step of displaying all the parameters on a display screen on the mobile unit prior to delivering the requested information content.

14. The method of claim 1; and further comprising a step of measuring a remaining amount of time that the mobile unit is able to communicate with the respective node, and a step of displaying the remaining amount of time on a display screen on the mobile unit.

15. The method of claim 14; and further comprising a step of displaying a total amount of time that the mobile unit has been in communication with the respective node.

16. The method of claim 10; and further comprising a step of encrypting the information content prior to delivery.

17. The method of claim 10; and further comprising a step of paying for delivery of information content, including a step of presenting the user with different terms of payment by displaying the payment terms on a display screen of the mobile unit; and a step of selecting, by the user, one of the payment terms.

18. The method of claim 17, wherein the step of selecting one of the payment terms includes transmitting a user code to a payment validation site having reference codes, and validating the user code when the user code matches one of the reference codes.

19. The method of claim 1, wherein the recording step is performed by recording additional session particulars at the mobile unit on the network.

* * * * *